(12) United States Patent
Lipcsei et al.

(10) Patent No.: US 8,450,976 B2
(45) Date of Patent: May 28, 2013

(54) POWER TOPOLOGY WITH BATTERY CHARGING AND DISCHARGE CURRENT PROTECTION CAPABILITIES

(75) Inventors: Laszlo Lipcsei, Campbell, CA (US); Catalin Popovici, San Jose, CA (US); Alin Gherghescu, San Jose, CA (US)

(73) Assignee: O2Micro, Inc., Santa Clara, CA (US)

( * ) Notice: Subject to any disclaimer, the term of this patent is extended or adjusted under 35 U.S.C. 154(b) by 236 days.

(21) Appl. No.: 12/916,443

(22) Filed: Oct. 29, 2010

(65) Prior Publication Data

US 2012/0105008 A1    May 3, 2012

(51) Int. Cl.
*H02J 7/00* (2006.01)
*H02J 7/04* (2006.01)

(52) U.S. Cl.
USPC ............ 320/134; 320/136; 320/162; 320/163

(58) Field of Classification Search
USPC .................... 320/136, 134, 162, 163
See application file for complete search history.

(56) References Cited

U.S. PATENT DOCUMENTS

| | | | |
|---|---|---|---|
| 7,598,707 B2 * | 10/2009 | Yamamoto | 320/128 |
| 7,928,692 B2 * | 4/2011 | Carrier et al. | 320/119 |
| 2007/0190369 A1 * | 8/2007 | Leach et al. | 429/9 |

* cited by examiner

*Primary Examiner* — Richard V Muralidar
(74) *Attorney, Agent, or Firm* — Dentons US LLP

(57) ABSTRACT

Generally, a system includes a control circuitry configured to detect a current wherein the detected current is one of a battery discharge current or a battery charging current; a first transistor configured to disconnect a load from at least one of a battery and a DC/DC converter if the battery discharge current exceeds a maximum battery discharge current setting; and a second transistor configured to adjust the charging current to maintain the charging current at or near a charge current setting.

20 Claims, 6 Drawing Sheets

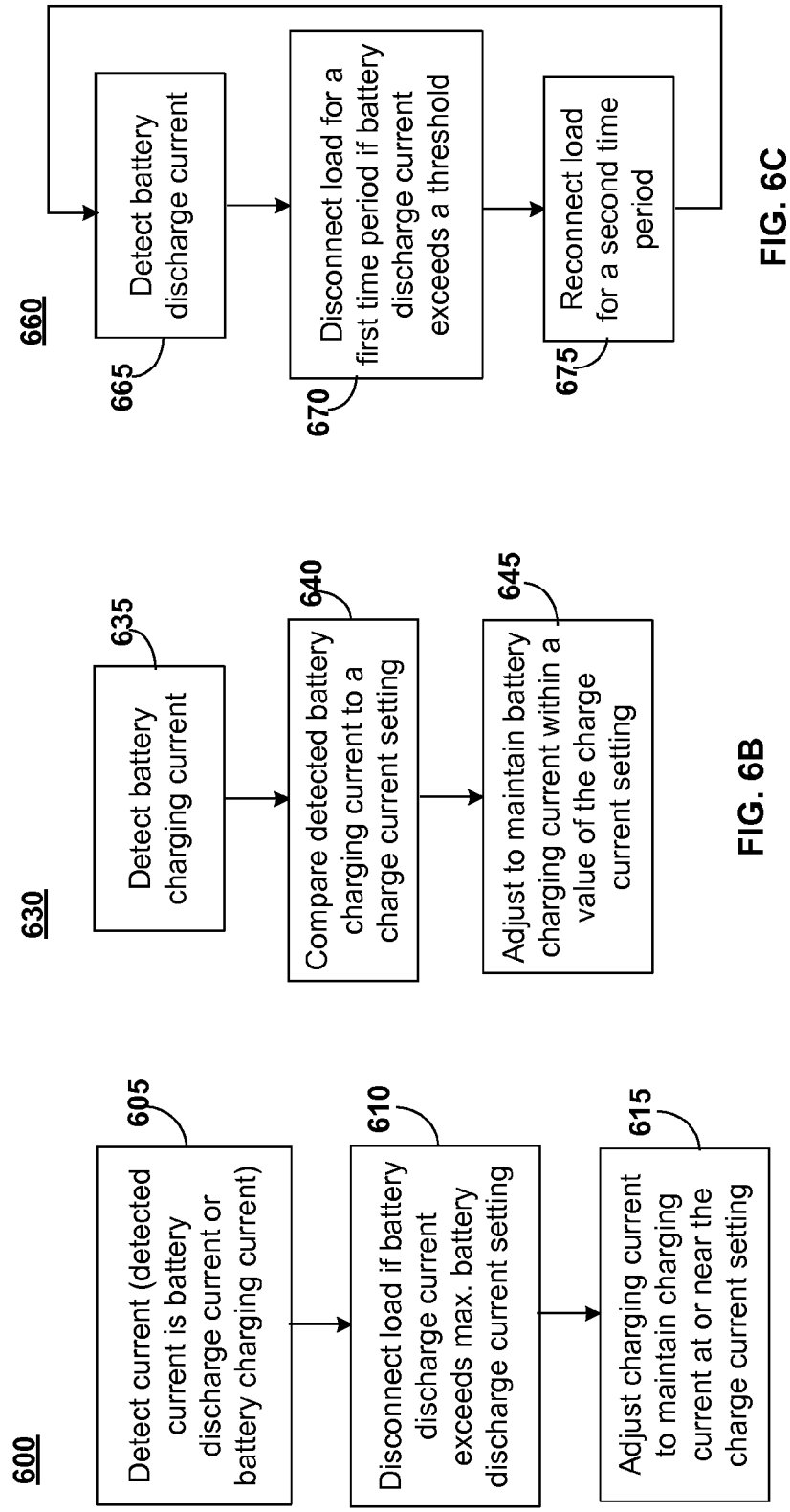

POWER TOPOLOGY WITH BATTERY CHARGING AND DISCHARGE CURRENT PROTECTION CAPABILITIES

BACKGROUND

In some applications, e.g., an electric vehicle, an input power supply system may provide a voltage that is greater than or less than a desired supply voltage for one or more electrical loads, e.g., vehicle systems. In such applications a DC/DC converter may be used to convert the input supply voltage to the desired supply voltage. In some such systems, a battery may be included that is configured to supply the one or more electrical loads, in case, for example, of a failure of the input power supply system, and/or to provide a buffer between the DC/DC converter and the load. The DC/DC converter may be directly connected to the battery. In these applications, the input power supply system may be configured to charge the battery and the battery may be configured to supply the load, e.g., the one or more vehicle systems.

The DC/DC converter may include an output current limit that is configured to limit the output current drawn from the DC/DC converter that may then limit the current supplied to the battery and/or the load. This current limit is generally configured to protect the DC/DC converter. Accordingly, the DC/DC converter current limit may not provide control of the charging current to the battery and is not configured to limit the discharge current between the battery and the load in, e.g., a shorted load condition.

SUMMARY

According to one aspect there is disclosed a system. The system may include a control circuitry configured to detect a current wherein the detected current is one of a battery discharge current or a battery charging current; a first transistor configured to disconnect a load from at least one of a battery and a DC/DC converter if the battery discharge current exceeds a maximum battery discharge current setting; and a second transistor configured to adjust the charging current to maintain the charging current at or near a charge current setting.

According to another aspect there is disclosed a method. The method may include detecting a current using a control circuitry, wherein the detected current is one of a battery discharge current or a battery charging current; disconnecting a load from at least one of a battery and a DC/DC converter, using a first transistor, if the battery discharge current exceeds a maximum battery discharge current setting; and adjusting the charging current using a second transistor to maintain the charging current at or near a charge current setting.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIGS. 6A through 6C depict flowcharts of exemplary operations for controlling battery charging and/or providing battery discharge protection, consistent with the present disclosure.

DETAILED DESCRIPTION

Figure 1:
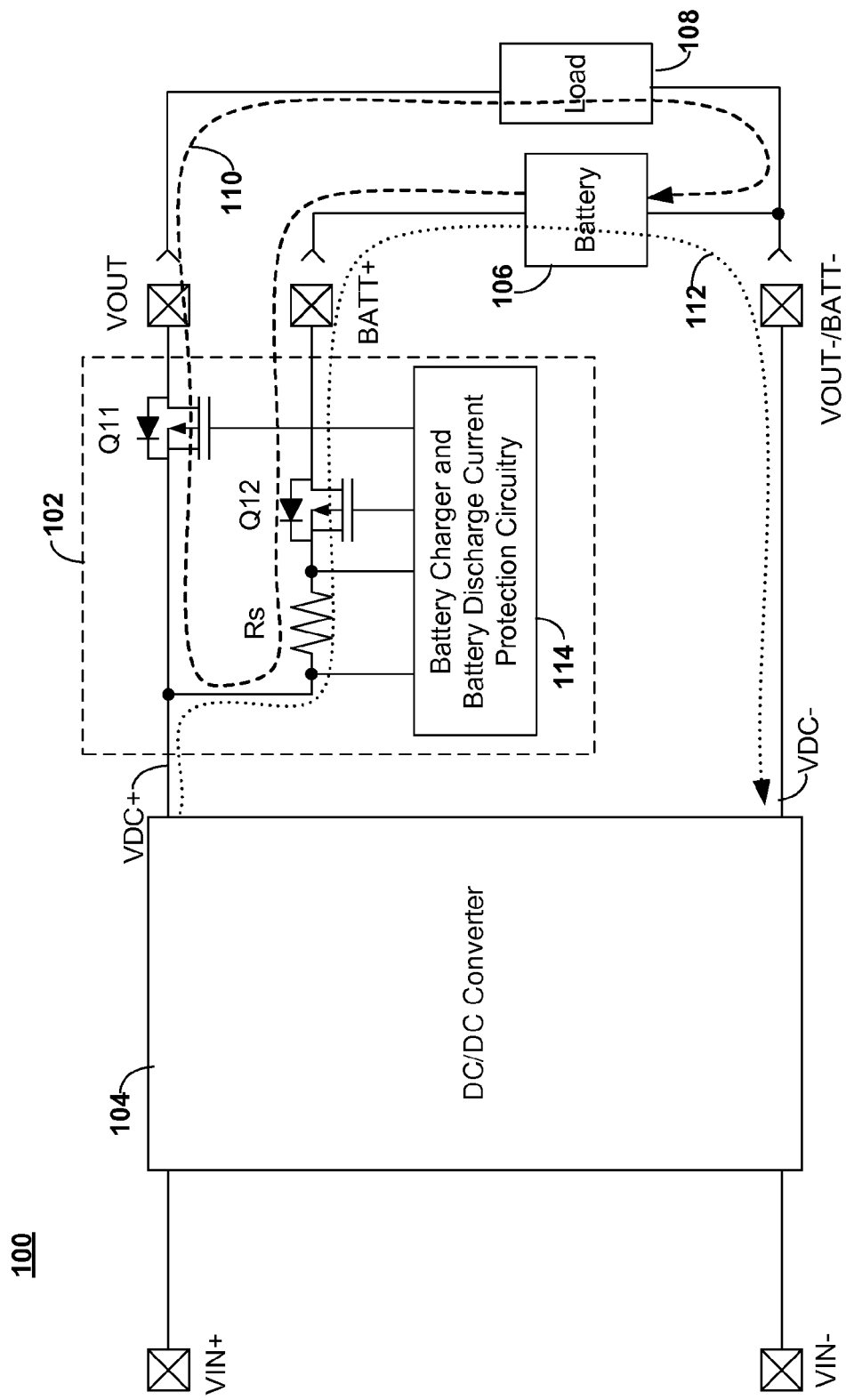
FIG. 1 depicts a block diagram of one exemplary power topology with battery charging and discharge current protection capabilities, consistent with the present disclosure.

A system and/or method consistent with the present disclosure is configured to provide battery charging control and discharge current protection capabilities. The system is configured to receive input power from a DC/DC converter and to supply power to a battery and/or a load. The input power to the system (i.e., the input power from the DC/DC converter) corresponds to the output power of the DC/DC converter. The battery is configured to supply power to one or more other systems ("load") at a voltage that may be different from the input voltage to the DC/DC converter. The system is configured to provide individual control of a battery charging path and a battery discharging path. A portion of the battery charging path may overlap a portion of the battery discharging path. The battery charging path may include the DC/DC converter configured to convert an input supply voltage to a battery charging voltage. The battery discharge path may include the load and is configured to supply power from the battery (and/or the DC/DC converter) to the load. The system and/or method are configured to independently control battery charging current and provide battery discharge current protection.

The system is configured to detect the battery charging current and adjust the battery charging current to maintain the battery charging current to within a value (e.g., +/−5%) of a predetermined charge current setting. The system is configured to detect battery discharge current and to disconnect the load from the battery (and/or the DC/DC converter) if the detected discharge current exceeds a threshold (e.g., in case the load becomes shorted).

As used herein, "connected" in the context of a load and a battery, corresponds to coupled in a manner that allows current to flow and "disconnected" means not coupled in a manner that allows a current to flow. For example, a load is "connected" to a battery if current may flow between the battery and the load. In other words, the load is connected to the battery if a continuous path exists from a positive terminal of the battery through the load to the negative terminal of the battery (so that current may flow). If a load is "disconnected" from a battery, current may not flow between the battery and the load. A load and a battery that are disconnected may still be coupled, e.g., the positive terminal of the battery may be attached to the load but the negative terminal of the battery may not be attached to the load.

Outside the context of a load and a battery and the current flow therebetween, "coupled" may include intermediate components and "connected" means directly coupled, i.e., without intermediate components. For example, a first element is coupled to a second element if a continuous path exists between the two elements and the continuous path may include intermediate elements. In another example, a first element is connected (directly coupled) to a second element if a continuous path exists between the two elements and the continuous path does not include intermediate elements.

FIG. 1 depicts a block diagram of one exemplary power topology 100, including a system 102 with battery charging and discharge current protection capabilities, consistent with the present disclosure. The power topology 100 may include a DC/DC converter 104, a battery 106 and a load 108. The system 102 may include control circuitry, e.g., battery charger and battery discharge current protection circuitry 114, a sense resistor Rs, a first transistor Q11 and a second transistor Q12. The system 102 is configured to prevent excessive battery discharge current from the battery 106 to the load 108 along a first (battery discharge) path 110 and to control battery charging current along a second (battery charging) path 112.

The DC/DC converter 104 is configured to receive an input power (voltage and current) at its input terminals VIN+ and VIN− and is configured to provide a voltage and current at its output terminals that may be coupled to terminals VDC+ and VDC−. The voltage at output terminals VDC+ and VDC− may be different from the voltage at input terminals VIN+ and VIN− and may correspond to a nominal voltage of battery 106.

For example, in an electric vehicle, the input power may be supplied by the main batteries of the electric vehicle, i.e., the batteries configured for vehicle propulsion. Depending on the battery technology (e.g., lead acid, lithium ion, etc.), the voltage of the main batteries may be in the range of about 50 volts to about 1000 volts. Continuing with this example, the DC/DC converter output voltage may correspond to a conventional supply voltage for one or more vehicle system(s) included in load 108. The vehicle system(s) may include, but are not limited to, power seat(s), windows and/or door locks, entertainment systems, navigation systems, comfort systems and/or other vehicle systems that are configured to be powered by a conventional vehicle supply voltage, e.g., 12 volts (nominal). Battery 106 may be configured to supply power to these vehicle system(s) in case of a failure and/or unavailability of the main vehicle propulsion batteries. Accordingly, battery 106 may have a nominal voltage of 12 volts. These examples are provided for illustration. The present disclosure is not limited to a particular battery voltage and may be used in applications with greater and/or lesser DC/DC converter output voltages.

The battery 106 is configured to supply power to the load 108 at its nominal voltage. The battery 106 may buffer the output voltage of the DC/DC converter. The battery 106 may be configured to supply power to the load 108 for a predefined period of time in case of disconnection, unavailability and/or failure of the DC/DC converter and/or the input power supply. For example, the battery 106 may have an associated battery capacity rating corresponding to an amount of time that the battery may supply a particular current while maintaining the battery's output voltage above a value (e.g., above a minimum operating voltage associated with the load).

System 102 is configured to provide individual control of a battery charging path 112 and a battery discharge path 110. System 102 is configured to control a charging current to battery 106 and to protect the battery from an excessive discharge current, e.g., if the load becomes shorted. A current (discharge current) in the battery discharge path 110 may flow from a positive terminal of battery 106 to terminal BATT+ through an internal diode of the second transistor Q12 through sense resistor Rs through the first transistor Q11 through terminal VOUT through the load 108 to terminal VOUT−/BATT− and a negative terminal of battery 106. A current (charge current) in the battery charging path 112 may flow from the positive output terminal VDC+ of the DC/DC converter 104 through the sense resistor Rs through the second transistor Q12 to terminal BATT+ to battery 106 and from battery 106 to terminal VOUT−/BATT− to the negative output terminal VDC− of the DC/DC converter 104. The power topology 100 is configured to allow supplying the load 108 from the DC/DC converter 104 while charging the battery 106, as described herein. The power topology 100 is configured to allow disconnecting the load 108 from the battery 106 and/or the DC/DC converter 104 if an excessive battery discharge current is detected.

The battery charger and battery discharge current protection circuitry 114 is configured to detect the current (i.e., the discharge current or the charge current) via sense resistor Rs. For example, the battery charger and battery discharge current protection circuitry 114 may be configured to detect a voltage across the sense resistor, representative of the current through the sense resistor. Based at least in part on the detected voltage and/or current, the battery charger and battery discharge current protection circuitry 114 is configured to provide a first signal (discharge control signal) to the first transistor Q11 and/or a second signal (charge control signal) to the second transistor Q12.

For example, Q11 and Q12 may be p-channel MOSFET (pMOS) transistors. As will be understood by those skilled in the art, pMOS transistors may be turned on (i.e., may conduct) by driving a gate voltage low and may be turned off (i.e., may not conduct) by driving the gate voltage high. Conduction of pMOS transistors may be controlled by adjusting the gate drive voltage between the on and off states.

The discharge control signal may be configured to control a state of the first transistor Q11 (e.g., turn the first transistor Q11 on or off by adjusting a gate voltage of the first transistor Q11). The battery charger and battery discharge current protection circuitry 114 may be configured to turn the first transistor Q11 off if the detected current through Rs exceeds a threshold corresponding to a predefined maximum discharge current. Turning Q11 off may prevent current flow from the battery 106 to the load 108 and from the DC/DC converter 104 to the load 108. In other words, when Q11 is off (i.e., not conducting), the load 108 may be disconnected from both the battery 106 and the DC/DC converter 104. In some embodiments, if the battery charger and battery discharge current protection circuitry 114 has turned the first transistor Q11 off, the battery charger and battery discharge current protection circuitry 114 may be configured to turn Q11 on after a time period (i.e., reconnect the load 108 to battery 106 and/or DC/DC converter 104). If the detected current through Rs continues to exceed the threshold, the battery charger and battery discharge current protection circuitry 114 may be configured to again turn the first transistor Q11 off. In this manner, the load 108 may again be connected to battery 106 and/or DC/DC converter 104 if the fault (e.g., short circuit) has been removed.

In some embodiments, the battery charger and battery discharge current protection circuitry 114 may be configured to turn Q12 off, if, when battery 106 is connected, a reverse current is detected in sense resistor Rs (e.g., battery 106 connected with polarity reversed: positive battery terminal connected to terminal VOUT−/BATT− and negative battery terminal connected to terminal BATT+). Turning Q12 off may then decouple the battery from the load, as described herein.

The charge control signal may be configured to control the conduction of the second transistor Q12 (e.g., by adjusting a gate voltage of Q12) to maintain the charge current at or near a predetermined level (charge current setting). The charge control signal may be configured to maintain operation of the second transistor Q12 in its linear region. The battery charger and battery discharge current protection circuitry 114 may be configured to adjust the conduction of the second transistor Q12 based at least in part of the detected current through Rs. If the detected current through Rs is a first amount greater than the predetermined charge current setting, the battery charger and battery discharge current protection circuitry 114 may be configured to reduce the conduction of Q12 (e.g., increase the gate voltage of Q12) to reduce the charge current. If the detected current through Rs is a second amount less than the predetermined charge current setting, the battery charger and battery discharge current protection circuitry 114 may be configured to increase the conduction of Q12 (e.g., decrease the gate voltage of Q12) to increase the charge current. In this manner, the charge current in the second path 112 that includes the DC/DC converter 104 and the battery 106 may be adjusted to be at or near the charge current setting by controlling the conduction (e.g., by adjusting the gate voltage) of the second transistor Q12. In some embodiments, the first amount and the second amount may be the same.

In the power topology 100 of FIG. 1, charging current or discharge current may flow in sense resistor Rs. Whether charging current or discharging current is flowing may depend on the DC/DC converter 104, the battery 106 and/or the load 108. Charging current may flow between the DC/DC converter 104 and the battery 106 (through sense resistor Rs) when the DC/DC converter is supplying sufficient current to charge the battery 106 and to supply the load 108. Discharge current may flow from the battery when the DC/DC converter 104 is supplying insufficient current for the load 108. In this case, the battery 106 and the DC/DC converter 104 (if capable of supplying current) may together supply the load 108 or the battery alone may supply the load (if the DC/DC converter is not capable of supplying current).

For example, the DC/DC converter 104 is configured to supply current up to its internal current limit. The current supplied from the DC/DC converter 104 may be split between the battery 106 (charging current) and the load 108 (load current). Whether charging current is supplied to the battery 106 is based, at least in part, on the load current. If the load current is less than a difference between the DC/DC converter 104 current limit and the battery charge current setting, then the charging current (adjusted by the battery charger and battery discharge current protection circuitry 114, as described herein) may be supplied to the battery 106. If the load current is greater than the difference between the DC/DC converter 104 current limit and the battery charge current setting and less than the DC/DC converter 104 current limit, then the charging current may be less than the charge current setting. In this case, the battery charger and battery discharge current protection circuitry 114 may adjust the gate voltage to transistor Q12 to maximize the conductance of transistor Q12. If the load current is greater than the current limit, then discharge current may flow from the battery 106 to the load 108. In this case, discharge current up to the maximum discharge current may be drawn from the battery 106. If the discharge current increases to exceed the maximum discharge current, then the battery charger and battery discharge current protection circuitry 114 may control Q11 to disconnect the load 108 from the DC/DC converter 104 and/or the battery 106, as described herein.

When discharge current is flowing in the sense resistor Rs, this current may flow from the battery 106 through the second transistor Q12 (e.g., through the internal diode of Q12), the sense resistor Rs and the first transistor Q11 to the load 108 along the discharge path 110. If the DC/DC converter 104 is also supplying current then current from the battery 106 and current from the DC/DC converter 104 may flow both through the first transistor Q11. The battery charger and battery discharge current protection circuitry 114 is configured to control the first transistor Q11 based, at least in part, on the current through the sense resistor Rs. If the discharge current drawn from the battery 106 exceeds the maximum discharge current setting, then the battery charger and battery discharge current protection circuitry 114 is configured to turn the first transistor Q11 off, to disconnect the load 108 from both the battery 106 and the DC/DC converter 104. For example, the discharge current may exceed the maximum discharge current setting if the load 108 becomes shorted.

When charging current is flowing in the sense resistor Rs, this current (charging current) may flow from the DC/DC converter 104 through the sense resistor Rs through the second transistor Q12 to the battery 106. If the DC/DC converter 104 is also supplying current to the load 108, then this current (load current) may flow from the DC/DC converter through the first transistor Q11 to the load 108. The battery charger and battery discharge current protection circuitry 114 is configured to adjust the conduction of the second transistor Q12 to maintain the charging current at or near a charge current setting. The battery charger and battery discharge current protection circuitry 114 may also be configured to maintain the first transistor Q11 turned on to allow load current to flow from the DC/DC converter 104 to the load 108 while the battery 106 is charging.

Advantageously, in the power topology 100 of FIG. 1, sense resistor Rs may be used to sense both charging and discharge current. If charging current is flowing, since charging current flows opposite discharge current, the battery charger and battery discharge current protection circuitry 114 may maintain the first transistor Q11 turned on since charging current corresponds to a negative discharge current.

In some embodiments, the system 102 may be configured to protect against a battery coupled with polarity reversed. In this situation (reverse polarity), the negative terminal of battery 106 may be connected to terminal BATT+ and the positive terminal of the battery 106 may be connected to terminal BATT−.

If, in the reverse polarity situation, the DC/DC converter 104 is coupled and operational, a voltage corresponding to a sum of the DC/DC converter 104 voltage and the battery 106 voltage (e.g., VDC+VB) may be applied to a series combination of the sense resistor Rs and the transistor Q12. Current flowing in the sense resistor Rs may be positive in the sense of charging current. The battery charger and battery discharge current protection circuitry 114 may then control transistor Q12 (e.g., decrease its conductance) to maintain the current at or near the charge current setting. In a "normal" polarity situation, a voltage corresponding to a difference between the DC/DC converter 104 voltage and the battery 106 voltage (e.g., VDC−VB) may be supplied to the series combination. Since the sum, VDC+VB, is greater than the difference, VDC−VB, in this reverse polarity situation, the battery charger and battery discharge current protection circuitry 114 may adjust the gate voltage of transistor Q12 to decrease its conductance and reduce current flow.

If, in the reverse polarity situation, the DC/DC converter 104 is not coupled and/or not operating (i.e., not supplying current), there may be no supply voltage to the battery charger and battery discharge current protection circuitry 114 and/or transistor Q12. Transistor Q12 may then be off (not conducting). In this situation, reverse current may not flow from the battery 106 because the internal diode of transistor Q12 will be reversed biased.

In some embodiments, battery 106 polarity may be monitored, e.g., by the battery charger and battery discharge current protection circuitry 114. In these embodiments, the battery charger and battery discharge current protection circuitry 114 may be configured to turn Q12 off to disconnect the battery 106 from the DC/DC converter 104 and the load 108 if the battery 106 is connected with reverse polarity.

Accordingly, the power topology 100 of FIG. 1 is configured to provide a battery charging path and a battery discharging path and individual control for battery charging current and/or battery discharge current protection. Currents along the paths may be controlled (i.e., adjusted) by the first and/or second transistor(s) Q11, Q12. The current, i.e., battery charging current or battery discharging current, may be detected by the battery charger and battery discharge current protection circuitry 114 using the sense resistor Rs. Advantageously, rather than relying on the current limit of the DC/DC converter 104, charging current may be maintained at or near a charge current setting by controlling the conduction of the second transistor Q12. Battery 106 may be protected from excessive discharge current draw (e.g., in case of a shorted load), by controlling Q11 (e.g., to turn on or off) in response to the discharge current detected in sense resistor Rs. For example, Q11 may be turned off in response to the detected discharge current being above a threshold, to disconnect the load 108 from the battery and/or DC/DC converter. The battery charger and battery discharge current protection circuitry 114 may be configured to reconnect (i.e., retry) the load 108 to the battery 106 and/or DC/DC converter after a time interval.

The power topology 100 of FIG. 1 may be implemented using p-channel MOSFETs, as described herein. In some configurations, it may be desirable to use n-channel MOSFETs. In the power topology 100 of FIG. 1, the first and second transistors are configured to control the connection between the positive terminal of the battery 106 and the positive terminal of the load 108 and/or to the positive output terminal VDC+ of the DC/DC converter 104. In this first configuration, the negative terminals of the battery 106 and the load 108 may be connected to the negative output terminal VDC− of the DC/DC converter 104 (i.e., negative terminals may be "common"). If n-channel MOSFETs are used, the n-channel transistors may be configured to control the connection between the negative terminal of the battery 106 and the negative terminal of the load 108 and/or to the negative output terminal VDC− of the DC/DC converter 104. In this second configuration, the positive terminals of the battery 106 and load 108 may be connected to the positive output terminal VDC+ of the DC/DC converter (i.e., the positive terminals may be "common"). As will be understood by those skilled in the art, n-channel MOSFETs may provide a lower cost and increased performance compared to p-channel MOSFETs.

Figure 2:
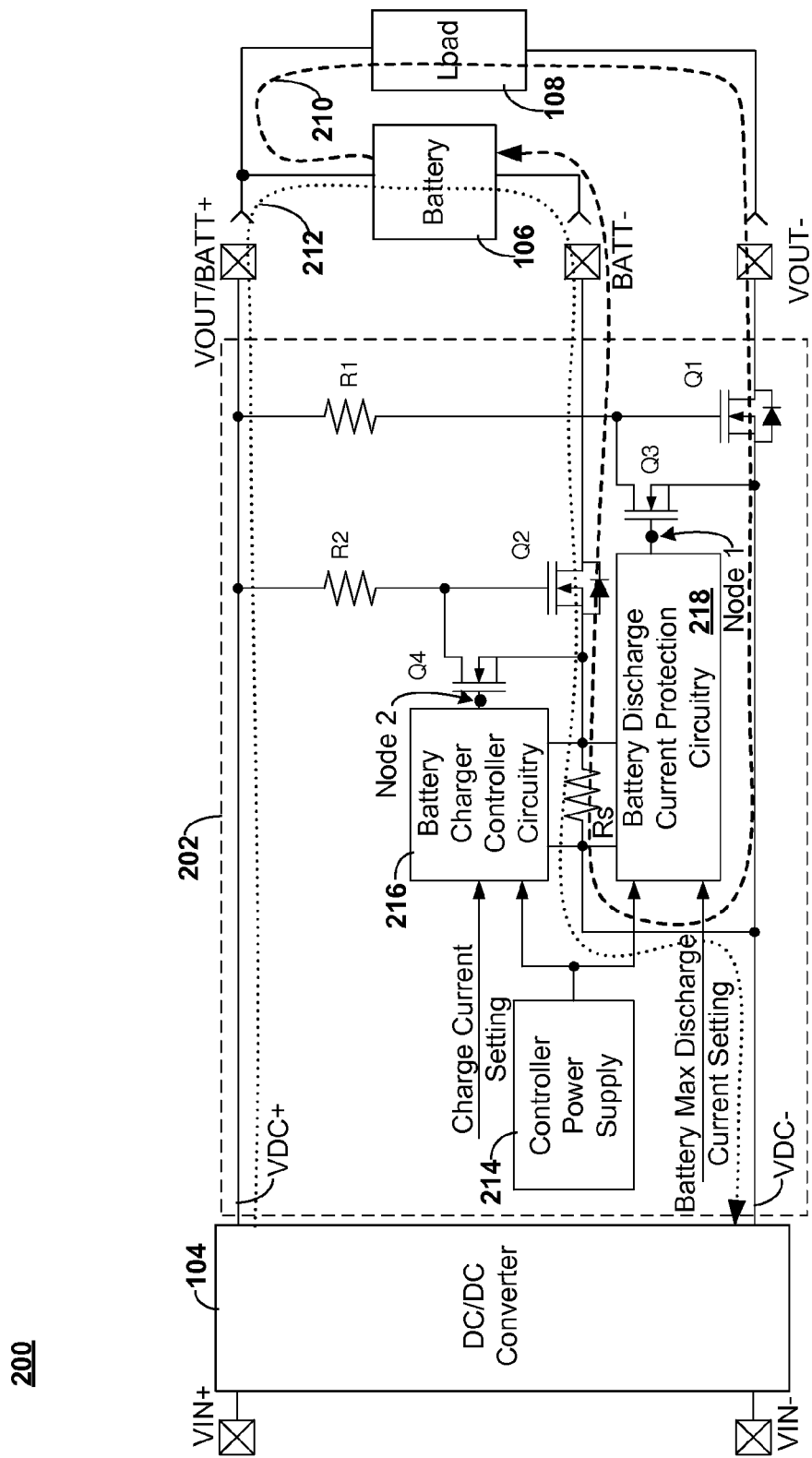
FIG. 2 depicts a block diagram of another exemplary power topology with battery charging and discharge current protection capabilities, consistent with the present disclosure.

FIG. 2 depicts a block diagram of another exemplary power topology 200, including a system 202 with battery charging and discharge current protection capabilities, consistent with the present disclosure. Similar to power topology 100, power topology 200 may include the DC/DC converter 104, the battery 106 and the load 108, as described herein. The system 202 may include a controller power supply 214, a first control circuitry, e.g., battery charger controller circuitry 216, a second control circuitry, e.g., battery discharge current protection circuitry 218, the sense resistor Rs, a first resistor R1, a second resistor R2 and first, second, third and fourth transistors, Q1, Q2, Q3, Q4. The system 202 is configured to prevent excessive battery discharge current from the battery 106 to the load 108 along a first (discharge) path 210 and to control battery charging current from the DC/DC converter 104 to the battery 106 along a second (charging) path 212.

System 202 is configured to provide individual control of the battery charging path 212 and the battery discharge path 210. System 202 is configured to control a charging current to battery 106 and/or to protect the battery 106 from an excessive discharge current, e.g., if the load 108 becomes shorted. A current (discharge current) in the first path 210 may flow from the positive terminal of the battery 106 through the load 108 to terminal VOUT− through the first transistor Q1 through sense resistor Rs through the internal diode of the second transistor Q2 (and/or through Q2 when ON) to terminal BATT− to the negative terminal of battery 106. A current (charge current) in the second path 212 may flow from the positive output terminal VDC+ of the DC/DC converter 104 to terminal VOUT/BATT+ to battery 106 and from battery 106 through the second transistor Q2 through the sense resistor Rs to the negative output terminal VDC− of the DC/DC converter 104.

The controller power supply 214 may by supplied by the DC/DC converter 104 and/or the battery 106. The controller power supply 214 may be coupled to terminals VDC+ and VDC−. When the DC/DC converter 104 is coupled to system 202 and operational, the controller power supply 214 may receive power from the DC/DC converter 104 via VDC+ and VDC−. If the DC/DC converter 104 is not coupled and/or is not operational, the controller power supply 214 may receive power from the battery 106, if the battery 106 is connected to system 202. If the battery 106 is connected, the controller power supply 214 may receive power from the battery 106 at terminals VDC+ and VDC− via the internal diode of Q1.

The battery charger controller circuitry 216 is configured to detect the charge current via sense resistor Rs. The battery discharge current protection circuitry 218 is configured to detect the discharge current via sense resistor Rs. For example, the battery charger controller circuitry 216 and/or the battery discharge current protection circuitry 218 may be configured to detect a voltage across the sense resistor, representative of the current through the sense resistor. Based at least in part on the detected voltage and/or current, the battery discharge current protection circuitry 218 is configured to provide a first signal (discharge control signal) to a first transistor pair (discharge transistor pair) that includes the first and third transistors Q1 and Q3 and/or the battery charger controller circuitry 216 is configured to provide a second signal (charging control signal) to a second transistor pair (charge transistor pair) that includes the second and fourth transistors Q2 and Q4. For example, Q1, Q2, Q3 and Q4 may be n-channel MOSFET (nMOS) transistors.

As will be appreciated by those skilled in the art, for nMOS transistors, in order to turn an nMOS transistor on, the gate is driven higher than the source, i.e., the gate voltage is greater than the voltage at the source of the of the nMOS transistor. In power topology 200, if transistors Q3 and Q4 were eliminated, the gates of transistors Q1 and Q2 would be coupled to Node 1 (output of battery discharge current protection circuitry 218) and to Node 2 (output of battery charger controller circuitry 216), respectively. If battery discharge current protection circuitry 218 and/or the battery charger controller circuitry 216 were unable to function (e.g., because the controller power supply 214 failed), transistors Q1 and Q2 would then be off. With transistors Q1 and Q2 off, the DC/DC converter 104 and the battery 106 would be disconnected from the load 108 and the DC/DC converter would be disconnected from the battery 106.

The system 202, including transistors Q3 and Q4, is configured to connect the battery 106 to the load 108 and the DC/DC converter 104 in the event the battery discharge current protection circuitry 218 and/or the battery charger controller circuitry 216 are unable to function (e.g., because of a failure of the controller power supply 214). In other words, when transistors Q3 and Q4 are off, transistors Q1 and Q2 are configured to be turned on via resistors R1 and R2 that couple the gates of transistors Q1 and Q2 to VDC+ and VOUT/BATT+. If the battery discharge current protection circuitry 218 and/or the battery charger controller circuitry 216 are unable to function, with transistors Q1 and Q2 on (i.e., conducting), power may be supplied to the battery 106 and/or the load 108 by the DC/DC converter 104 and/or the battery 106 may supply the load 108. In this mode (i.e., controller power supply failure), the charging current to the battery 106 may limited by a current limit of the DC/DC converter 104 and the battery 106 may not be protected from excessive discharge current due to, e.g., a shorted load 108. This functionality corresponds to a power topology without system 202.

The battery discharge current protection circuitry 218 is configured to provide the discharge control signal to control a state of transistor Q3 and, via Q3, a state of Q1, i.e., to drive transistors Q3 and Q1 to one or the other of two states (on or off). The battery discharge current protection circuitry 218 is configured to turn transistor Q3 on and, accordingly, transistor Q1 off, if the detected current through the sense resistor Rs exceeds a threshold corresponding to a predefined maximum discharge current setting. Turning Q1 off is configured to disconnect the load 108 from the battery 106 and/or the DC/DC converter 104, as described herein. In some embodiments, if the battery discharge current protection circuitry 218 has turned the first transistor Q1 off, the battery discharge current protection circuitry 218 may be configured to turn Q1 on after a time period (i.e., reconnect the load 108 to battery 106 and/or DC/DC converter 104). If the detected current through Rs continues to exceed the threshold, the battery discharge current protection circuitry 218 may be configured to again turn the first transistor Q1 off. In this manner, the load 108 may again be coupled to battery 106 and/or DC/DC converter 104 if the fault (e.g., short circuit) has been removed.

The battery charger controller circuitry 216 is configured to adjust the conduction of Q4 and, via Q4, the conduction of Q2 to maintain transistors Q4 and Q2 in their linear operating regions to provide continuous adjustment of the battery charging current. The battery charger controller circuitry 216 is configured to adjust the conduction of Q4 (and Q2) based at least in part on the detected current through the sense resistor Rs, as described herein. In this manner, the charging current in the second path 212 that includes the DC/DC converter 104 and the battery 106 may be adjusted to be at or near the charge current setting by controlling the conduction of Q4, and thereby the conduction of Q2, as described herein.

In this manner, system 202 is configured to provide control of battery charging current about a set point (e.g., charge current setting). System 202 is further configured to provide protection from excessive battery discharge current by disconnecting the load when the detected battery discharge current exceeds the maximum battery discharge current setting.

Figure 3:
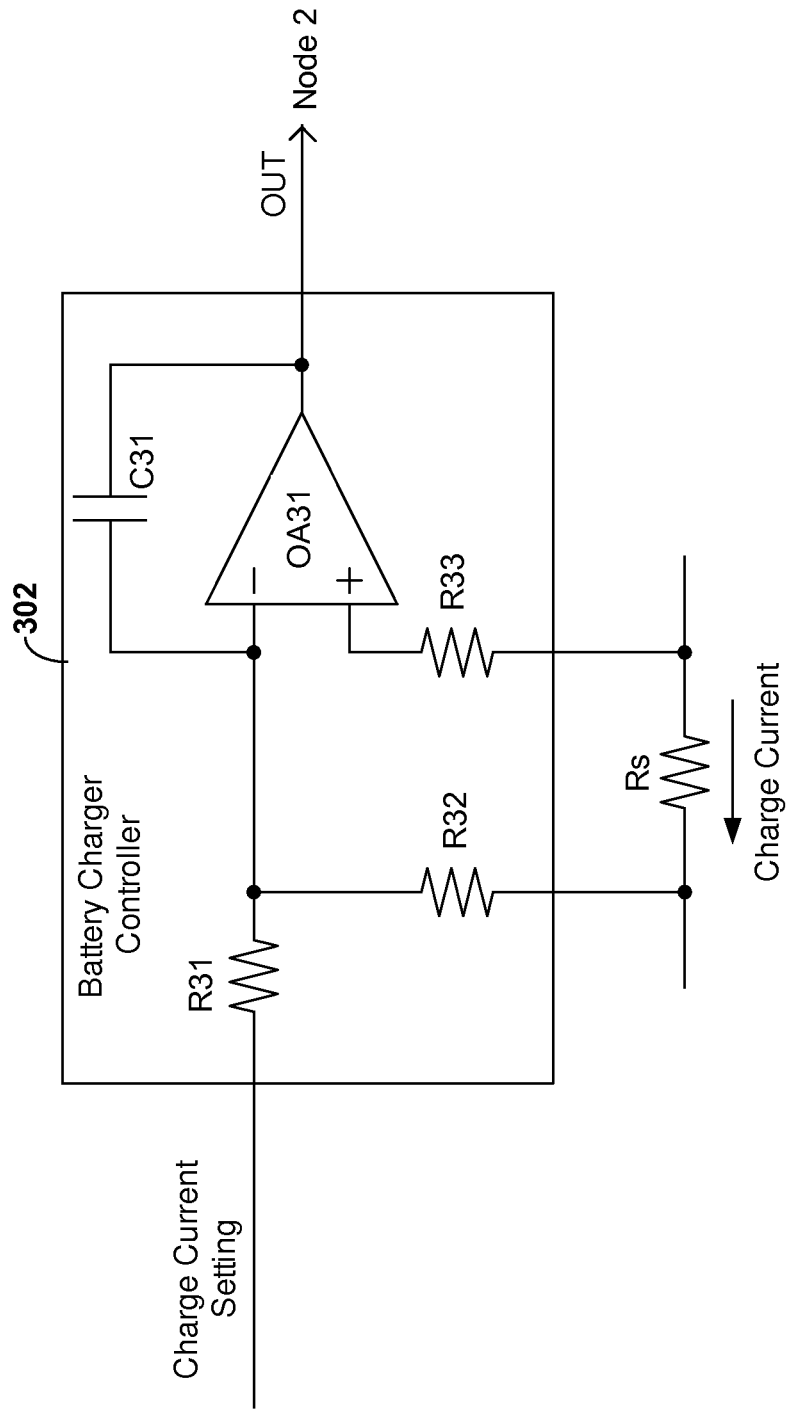
FIG. 3 depicts a block diagram of one example of a battery charger controller circuitry for the topology of FIG. 2, consistent with the present disclosure.

FIG. 3 depicts a block diagram of one example of a battery charger controller circuitry 302 for the topology of FIG. 2, consistent with the present disclosure. The battery charger controller circuitry 302 is configured to provide closed loop control of the battery charging current based, at least in part, on the detected battery charging current and the charge current setting. The battery charger controller circuitry 302 of this example includes an amplifier OA31, a capacitor C31 and resistors R31, R32 and may include resistor R33. The battery charger controller circuitry 302 is configured to receive a charge current setting, to be coupled to the sense resistor Rs and to provide an output OUT to, e.g., Node 2 of system 202 of FIG. 2.

Resistor R31 is coupled to resistor R32 and resistors R31 and R32 are coupled to an inverting input of the amplifier OA31. Resistor R31 is coupled to an input of the battery charger controller and is configured to receive a signal (e.g., a voltage) representative of the charge current setting. In some embodiments, the charge current setting may be generated within the battery charger controller circuitry 302. Resistors R31 and R32 are configured to provide a voltage divider of the charge current setting and to provide this divided voltage to the inverting input of the amplifier OA31.

Capacitor C31 is coupled between an output of the amplifier OA31 and the inverting input of the amplifier OA 31. Capacitor C31 is configured to provide a dominant pole (and therefore stability) for the battery charger controller circuitry 302. As may be appreciated by those skilled in the art, transistors, e.g., nMOS transistors Q2 and Q4, include internal capacitances. For example, the capacitance associated with the gate of Q4 and the parasitic capacitance associated with the drain of Q4, coupled to R32, may provide a relatively high frequency pole for the battery charger controller circuitry. C31 is configured to provide a dominant (lower frequency) pole and therefore relatively greater stability in the battery charger controller circuitry 302.

R33 may be coupled to an inverting input of the amplifier OA31. R33 is configured to compensate for nonideal properties of the inputs to the amplifier OA31, as will be understood by those skilled in the art. R32 and R33 are configured to be coupled to the sense resistor Rs.

When the battery charger controller circuitry 302 is coupled in the system 202 of FIG. 2, the sense resistor Rs may be connected between resistors R32 and R33 and the output of the amplifier OA31 may be coupled to Node 2 and the gate of transistor Q4. R31 and R32 may be selected such that when the voltage at the noninverting input of the amplifier OA31 (e.g., voltage across sense resistor Rs) is at or near the voltage at the inverting input of the amplifier OA31 (e.g., (R32/(R31+R32))*charge current setting voltage), the current through the sense resistor Rs corresponds to the charge current setting. If the current through the sense resistor Rs is greater than the charge current setting, then the battery charger controller circuitry 302 is configured to adjust (e.g., increase) the conductance of Q4 to adjust (e.g., decrease) the conductance of Q2 to reduce the charging current to the battery 104. If the current through the sense resistor Rs is less than the charge current setting, then the battery charger controller circuitry 302 is configured to adjust (e.g., decrease) the conductance of Q4 to adjust (e.g., increase) the conductance of Q2 to increase the charging current to the battery 104. In other words, if the detected charging current is greater than the charge current setting, battery charger controller circuitry 302 is configured to increase its output to increase the gate voltage to Q4 and decrease the gate voltage to Q2. Conversely, if the detected charging current is less than the charge current setting, battery charger controller circuitry 302 is configured to decrease its output to decrease the gate voltage to Q4 and increase the gate voltage to Q2. In this manner, the battery charger controller circuitry 302 is configured to maintain the charging current at or near the current corresponding to the charge current setting.

Figure 4:
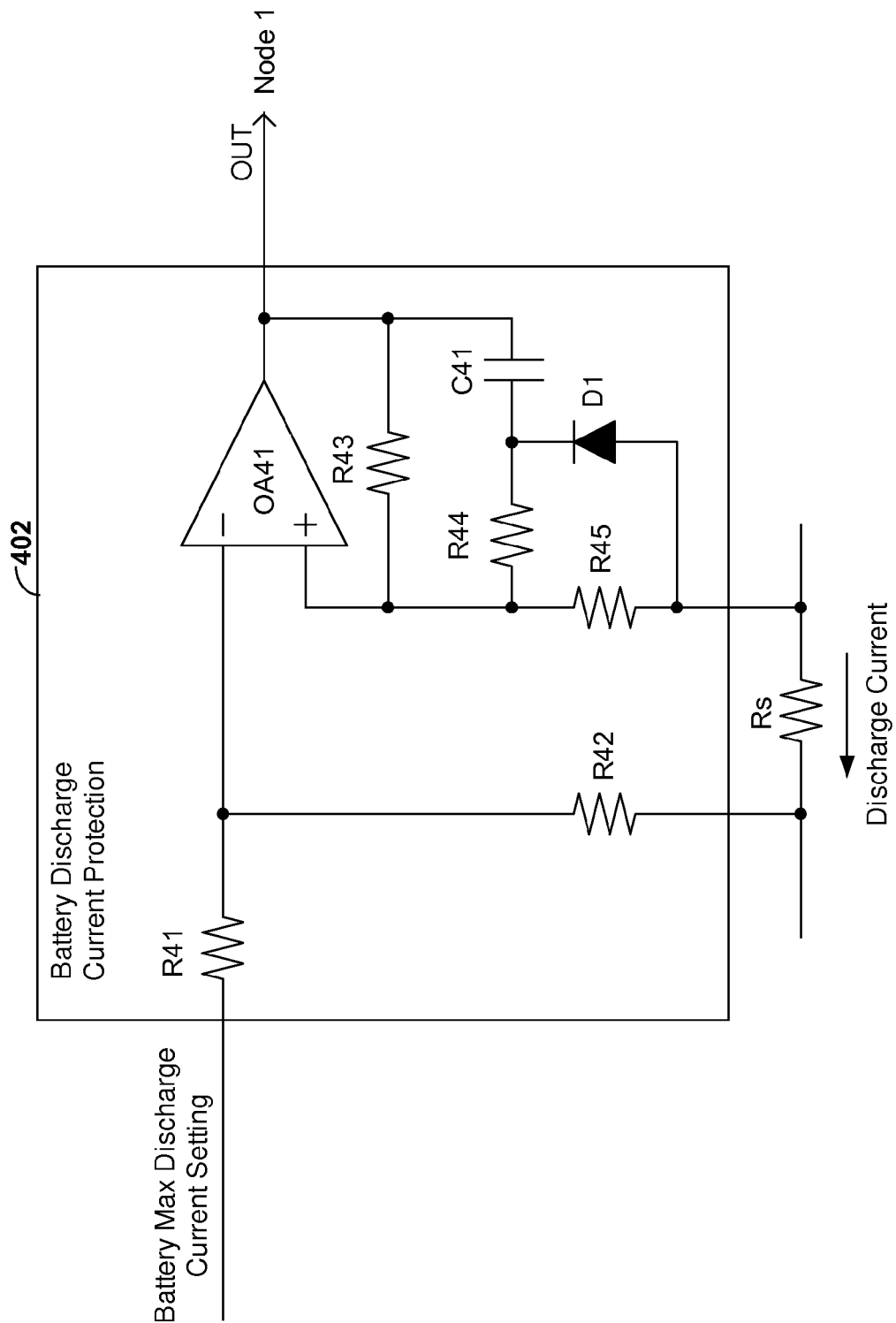
FIG. 4 depicts a block diagram of one example of a battery discharge current protection circuitry for the topology of FIG. 2, consistent with the present disclosure.

FIG. 4 depicts a block diagram of one example of a battery discharge current protection circuitry 402 for the topology of FIG. 2, consistent with the present disclosure. The battery discharge current protection circuitry 402 of this example includes an amplifier OA41, a plurality of resistors R41, R42, R43, R44 and R45, a capacitor C41 and a diode D1. In some embodiments, amplifier OA41 may be a comparator. Amplifier OA41 is configured to provide an output at or near its positive supply voltage (positive supply rail) when a voltage at a noninverting input is greater than a voltage at an inverting input and to provide an output at or near its negative supply voltage (negative supply rail) when the voltage at the noninverting input is less than the voltage at the inverting input. As will be appreciated by those skilled in the art, the negative supply voltage may be zero, i.e., ground.

The battery discharge current protection circuitry 402 is configured to receive a signal (e.g., a voltage) representative of a battery maximum discharge current setting. The battery discharge current protection circuitry 402 is configured to be coupled to the sense resistor Rs. The battery discharge current protection circuitry 402 is configured to provide an output to Node 1 (and the gate of Q3) of the system 202 of FIG. 2. The output is configured to turn Q3 on or off, to turn Q1 off or on to prevent or permit current flow between the battery 106 and/or the DC/DC converter 104 and the load 108.

In this example of battery discharge current protection circuitry 402, resistors R41 and R42 are connected to each other and to an inverting input of amplifier OA41. Resistor R43 is coupled between an output of the amplifier OA41 and a noninverting input of the amplifier OA41. Resistor R44 is coupled in series with the capacitor C41 and the series combination is coupled in parallel with resistor R43, between the output and the noninverting input of the amplifier OA41. Resistor R45 is coupled to the noninverting input of the amplifier OA41. An anode of diode D1 is coupled to R45 and a cathode of diode D1 is coupled to resistor R44 and capacitor C41.

Resistor R41 is configured to receive a signal representative of the battery maximum discharge current setting. R42 is configured to be coupled to a first terminal of the sense resistor Rs. R45 and the anode of the diode D1 are configured to be coupled to a second terminal of the sense resistor Rs when the battery discharge current protection circuitry 402 is coupled in the system 202 of FIG. 2.

The battery discharge current protection circuitry 402 is configured as a "hysteretic comparator". As will be understood by those skilled in the art, an output of a comparator may be low (e.g., at or near a negative power supply rail) or high (e.g., at or near a positive power supply rail) depending on a relative magnitude of signals on the input terminals of the comparator. For example, if the signal on the noninverting input is greater than the signal on the inverting input, the output of the comparator may be high and if the signal on the inverting input is greater than the signal on the noninverting input, the output of the comparator may be low. Typically, one input of the comparator is coupled to a reference and the other input of the comparator is coupled to an input signal to be compared to the reference. In this case, the output of the comparator is an indicator of whether the input signal is greater than or less than the reference.

In a hysteretic comparator, a value of the input signal that causes the output of the comparator to "switch" depends not only on the value of the input signal but also the output of the comparator (state of the comparator). For example, with the input signal applied to the noninverting input and a reference applied to the inverting input, if the output of the comparator is low, the value of the input signal that causes the comparator switch may be greater than the value of the input signal that causes the comparator to switch when the output is high.

The battery discharge current protection circuitry 402 is configured to turn transistor Q3 on and transistor Q1 off for a first (disconnected) time period if a current detected in the sense resistor exceeds a battery maximum discharge current corresponding to the battery maximum discharge current setting. When transistor Q3 is on and transistor Q1 is off, the load 108 is disconnected from the battery 106 and/or the DC/DC converter 104 and therefore discharge current may not flow from the battery nor in the sense resistor Rs. Charging current may flow in the sense resistor Rs when the load 108 is disconnected. This may allow charging the battery 106 from the DC/DC converter 104 while the load 108 is disconnected.

The battery discharge current protection circuitry 402 is configured to turn transistor Q3 off and transistor Q1 on for a second (connected) time period following the first time period. If the current detected in the sense resistor continues to exceed the battery maximum discharge current corresponding to the battery maximum discharge current setting, the battery discharge current protection circuitry 402 is configured to repeat turning transistor Q3 on and transistor Q1 off for the first time period followed by turning transistor Q3 off and transistor Q1 on for the second time period until the current detected in the sense resistor no longer exceeds the battery maximum discharge current. If the current detected in the sense resistor no longer exceeds the battery maximum discharge current, the battery discharge current protection circuitry 402 is configured to maintain transistor Q3 off and transistor Q1 on and to continue to monitor the battery discharge current via sense resistor Rs.

The first (disconnected) time period and the second (connected) time period may be unequal. A duration of the first time period may be based, at least in part, on a time constant associated with capacitor C41 and resistors R43, R44 and R45. A duration of the second time period may be based, at least in part, on a time constant associated with capacitor C41, resistors R43, R44 and R45, and diode D1. Diode D1 is configured to reduce the duration of the second time period relative to the first time period. For example, the duration of the first time period may be about 20 ms (milliseconds) and the duration of the second time period may be about 1 ms. Other durations are possible and are within the scope of this disclosure.

For example, assuming that, initially, the detected discharge current is less than the battery maximum discharge current and the output of the amplifier OA41 is low (e.g., at or near the negative supply rail), the battery 106 and the load 108 may be connected, the discharge current may be flowing in sense resistor Rs and a detected voltage Vs representative of the discharge current (e.g., Vs=Rs*discharge current) may be less than a voltage divided battery maximum discharge current setting (e.g., (R42/(R41+R42))*battery maximum discharge current setting). If the discharge current increases to a value above the maximum discharge current (e.g., due to a shorted load), Vs may then exceed the voltage divided battery maximum discharge current setting. The voltage at the noninverting input of the amplifier OA41 may then exceed the voltage at the inverting input causing the amplifier OA41 to "switch". As a result, the output of the amplifier OA41 may change from low to high resulting in transistor Q3 turning on, transistor Q1 turning off, disconnecting the load 108 from the battery 106 and/or the DC/DC converter 104 and stopping discharge current from flowing from the battery 106. As used herein, switch means change state, low corresponds to an output voltage at or near the negative supply rail and high corresponds to an output voltage at or near the positive supply rail. The transition of the output of the amplifier OA41 from low to high may be of relatively short duration (i.e., relatively fast) due to positive feedback through resistor R43.

The first time period may begin when the amplifier OA41 switches to an output high state. During the first time period, the capacitor C41 is configured to charge up toward the output voltage (high) of the amplifier OA41. A rate of charging the capacitor C41 may be based, at least in part on, a capacitance of capacitor C41 and a resistance of resistor R44. As C41 is charging, the voltage at the noninverting input of amplifier OA41 may be decreasing. When the voltage at the noninverting input of amplifier OA41 decreases to below the voltage at the inverting input of amplifier OA41, the amplifier OA41 may switch. As a result, the output of the amplifier OA41 may change from high to low resulting in transistor Q3 turning off, transistor Q1 turning on, reconnecting the load 108 to the battery 106 and/or the DC/DC converter 104 and enabling discharge current to flow from the battery 106 to the load and through sense resistor Rs.

The second time period may begin when amplifier OA41 switches to an output low state. During the second time period, the capacitor C41 is configured to discharge toward the output voltage (low) of the amplifier OA41. A rate of discharging the capacitor C41 may be based, at least in part on the capacitance of capacitor C41 and on diode D1. Diode D1 is configured to provide a discharge path for the capacitor C41 that results in a shorter time constant associated with discharging the capacitor relative to a time constant associated with charging the capacitor, as described herein. When the capacitor C41 is discharged, the load 108 may be coupled to the battery 106 and/or the DC/DC converter 104 allowing discharge current to flow in sense resistor Rs. If the discharge current is less than the battery maximum discharge current, the amplifier OA41 may remain in the output low state, maintaining the battery 106 connected to the load 108. If, at the end of the second time period, the discharge current increases to a value above the maximum discharge current (e.g., shorted load remains), Vs may then exceed the voltage divided battery maximum discharge current setting. The voltage at the noninverting input of the amplifier OA41 may then exceed the voltage at the inverting input causing the amplifier OA41 to "switch" to the output high state to disconnect the battery 106 and/or the DC/DC converter 104 from the load 108 and the cycle may repeat. In other words, if the load 108 remains shorted, battery discharge protection circuitry 402 may again disconnect the load 108 from the battery 106 and/or the DC/DC converter 104, as described herein.

In this manner, the battery discharge current protection circuitry 402 is configured to disconnect the battery 106 and/or DC/DC converter 104 from the load 108 for a first time period if the detected discharge current exceeds the maximum battery discharge current. The battery discharge current protection circuitry 402 is further configured to "retry" connecting the battery 106 and/or DC/DC converter 104 to the load 108 after the first time period. If the excessive discharge current condition remains, the battery discharge current protection circuitry 402 is configured to again disconnect the battery 106 and/or DC/DC converter 104 from the load 104 after the second time period and to repeat the cycle. The first (disconnected) time period may typically be longer than the second (connected) time period so that a discharge current greater than the maximum discharge current setting may be drawn from the battery 106 for a relatively short time.

Figure 5:
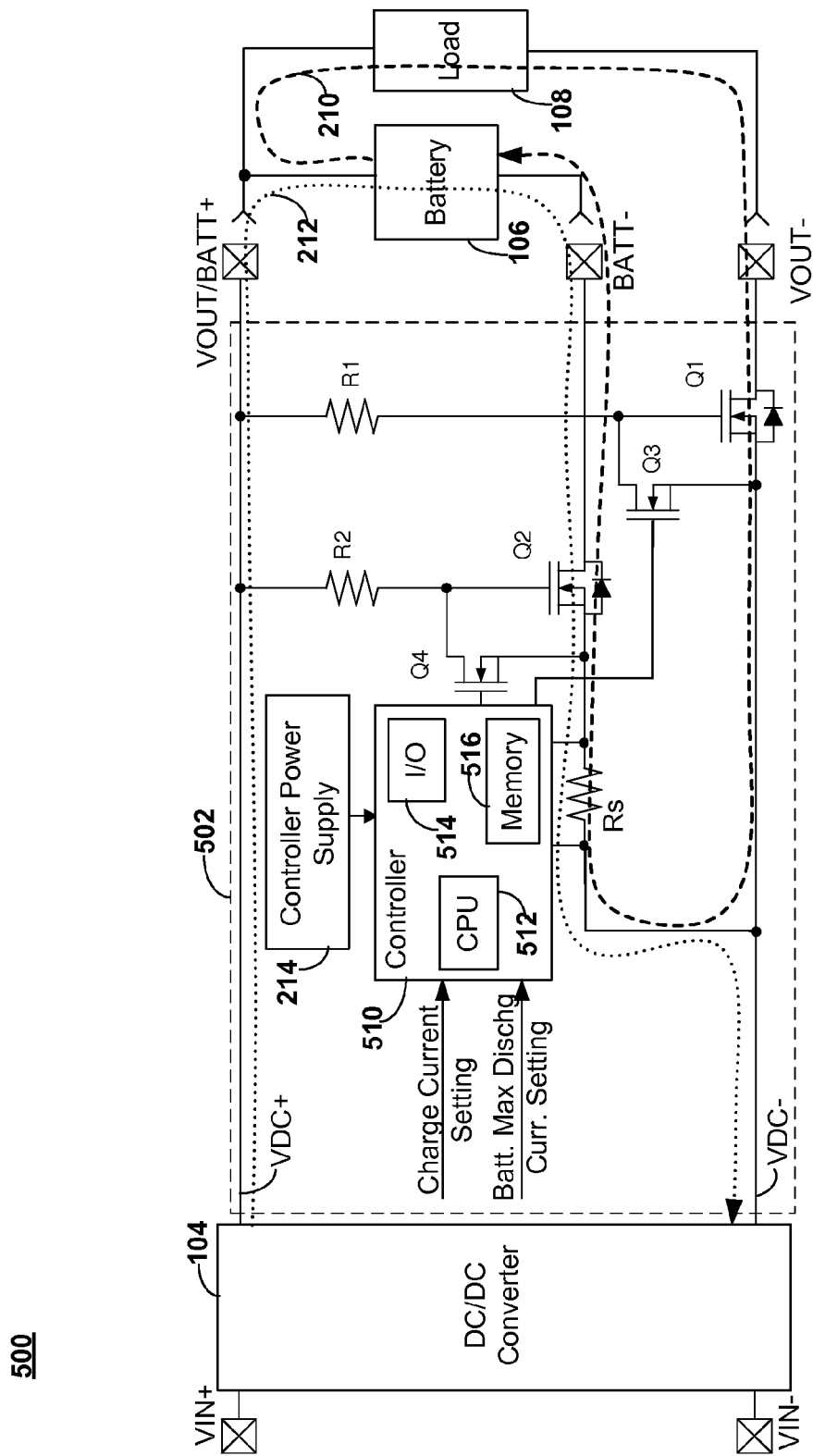
FIG. 5 depicts a block diagram of yet another exemplary power topology with battery charging and discharge current protection capabilities, consistent with the present disclosure.

FIG. 5 depicts a block diagram of yet another exemplary power topology 500, including a system 502 with battery charging and discharge current protection capabilities, consistent with the present disclosure. Similar to power topology 100 and power topology 200, power topology 500 may include the DC/DC converter 104, battery 106 and the load 108, as described herein. Similar to system 202, system 502 may include a controller power supply 214, the sense resistor Rs, a first resistor R1, a second resistor R2 and first, second, third and fourth transistors, Q1, Q2, Q3, Q4, as described herein. The system 502 may include a control circuitry, e.g., controller 510, configured to provide battery charging current control and/or battery discharge current protection.

The controller 510 may be configured to provide equivalent functionality as battery charge controller circuitry 216 and/or 302 and/or battery discharge protection circuitry 218 and/or 402, as described herein. The controller 510 may include a processor (CPU) 512, input and/or output circuitry (I/O) 514 and/or memory 516. As will be understood by those skilled in the art, the controller 510 may include additional circuitry. The system 502 is configured to prevent excessive battery discharge current from the battery 106 to the load 108 along a first (discharge) path 210 and to control battery charging current along a second (charging) path 212.

Similar to systems 102 and 202, system 502 is configured to provide individual control of a battery charging path (e.g., battery charging bath 212) and a battery discharge path (e.g., battery discharge path 201. Similar to system 202, system 502 is configured to control a charging current to battery 106 and/or to protect the battery 106 from an excessive discharge current, e.g., if the load 108 becomes shorted. The controller 510 is configured to detect the current (e.g., battery charging current or battery discharge current) via the sense resistor Rs, e.g., by detecting a voltage representative of the current through the sense resistor Rs. The controller 510 is further configured to provide one or more output signal(s) to transistors Q3 and/or Q4 in response to the detected current.

Controller 510 may include instructions stored in memory 516 that when executed by the processor CPU 512 cause the controller 510 to detect the current in the sense resistor Rs and to provide an output in response to the detected current. Memory 516 may include data representative of the charge current setting and/or the battery maximum discharge current setting. I/O circuitry 514 may include an analog to digital converter (ADC) configured to convert a detected analog signal to a digital representation of the detected analog signal. The ADC may be configured to detect the voltage across the sense resistor representative of the current (charging or discharge) through the sense resistor Rs and to convert the detected voltage to a digital representation of the detected voltage.

The controller 510 may be configured to detect current through the sense resistor Rs at predefined time intervals. The controller 510 may be configured to receive an interrupt if the detected current is greater than or less than a threshold.

The controller 510 is configured to determine whether the detected voltage represents a charging current or a discharge current. If the detected voltage represents a charging current, the controller 510 is configured to adjust an output signal coupled to the gate of transistor Q4. For example, I/O circuitry 514 may include a digital to analog converter (DAC) configured to convert digital data to a corresponding analog output signal. The controller 510 may be configured to provide an analog output signal to the gate of transistor Q4 using the DAC, as will be understood by those skilled in the art. If the detected voltage represents a discharge current, the controller 510 is configured to adjust an output signal coupled to the gate of transistor Q3.

In operation, the controller 510 is configured to adjust the gate voltage of transistor Q4 to in turn adjust the gate voltage of transistor Q2 to maintain the battery charging current at or near the charging current corresponding to the charge current setting. The controller 510 is configured to adjust the gate voltage of transistor Q3 to turn transistor Q1 on or off, in response to the detected battery discharge current. If the detected battery discharge current exceeds the current corresponding to the battery maximum discharge current setting, the controller 510 is configured to turn transistors Q3 on and Q1 off to disconnect the load 108 from the battery 106 and/or the DC/DC converter 104. The controller 510 may be configured to disconnect the load 108 for a first time interval. The controller 510 may be configured to then reconnect the load 108 (i.e., turn transistors Q3 off and Q1 on) for a second time interval and, if the excessive battery discharge current condition remains, to again disconnect the load for the first time interval. Durations of the time intervals may be provided by one or more timer(s). The timer(s) may be included in the controller 510, as will be understood by those skilled in the art.

Accordingly, system 502 is configured to maintain a battery charging current at or near a charge current setting and/or to prevent battery discharge current greater than a battery maximum discharge current setting from being drawn from battery 106.

FIGS. 6A through 6C depict flowcharts 600, 630, 660 of exemplary operations for battery charging and/or providing battery discharge protection, consistent with the present disclosure. The operations may be performed by circuitry, including controller 510, as described herein. Turning to FIG. 6A and flow chart 600, a current may be detected at operation 605. The current may be a battery discharge current or a battery charging current. Operation 610 may include disconnecting a load if the battery discharge current exceeds a maximum battery discharge current setting. The charging current may be adjusted to maintain the charging current at or near a charge current setting at operation 615.

Flow chart 630 (FIG. 6B) is one example of maintaining battery charging current at or near the charge current setting, consistent with the present disclosure. Battery charging current may be detected at operation 635. The detected battery charging current may be compared to a charge current setting at operation 640. Operation 645 may include adjusting to maintain the detected battery charging current with a value of the charge current setting. In this manner, battery charging current may be controlled to maintain the battery charging current to at or near the charge current setting.

Flow chart 660 (FIG. 6C) is one example of protecting a battery against excessive battery discharge current. Battery discharge current may be detected at operation 665. Operation 670 may include disconnecting a load for a first time period if the detected battery discharge current exceeds a threshold (e.g., battery maximum discharge current setting). The load may be reconnected for a second time period at operation 675. These operations may then be repeated. In this manner, a load may be disconnected from the battery and/or DC/DC converter if a battery discharge current is detected that exceeds the maximum battery discharge current setting (e.g., in case of a short in the load). Reconnecting the load to the battery and/or the DC/DC converter may be retried, and, if the discharge current is less than the maximum discharge current setting, the load may remain connected.

Accordingly, a plurality of systems have been described herein that are configured to provide individual control of a battery charging path and a battery discharging path. The systems are configured to detect battery charging current or battery discharge current and to control the battery charging current to maintain the charging current at or near a charge current setting and/or to disconnect the load from the battery and/or the DC/DC converter if a detected discharge current exceeds a maximum discharge current setting (e.g., in case of a short in the load).

Of course, while FIGS. 6A through 6C depict exemplary operations according to some embodiments, it is to be understood that in other embodiments all of the operations depicted in FIGS. 6A through 6C may not be necessary. Indeed, it is fully contemplated herein that other embodiments of the present disclosure may include sub-combinations of the operations depicted in FIGS. 6A through 6C and/or additional operations. Thus, claims directed to features and/or operations that are not exactly shown in one drawing are deemed within the scope and content of the present disclosure.

Memory 516 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 116 may comprise other and/or later-developed types of computer-readable memory.

Embodiments of the methods described herein may be implemented using a processor and/or other programmable device. To that end, the methods described herein may be implemented on a tangible computer readable medium having instructions stored thereon that when executed the processor and/or other programmable device perform the methods. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

Unless specifically stated otherwise, as apparent from the preceding discussions, it is appreciated that throughout the specification discussions utilizing terms such as "operations," "processing," "computing," "calculating," "determining," or the like, refer to the action and/or processes of a computer or computing system, or similar electronic computing device or apparatus, that manipulate and/or transform data represented as physical, such as electronic, quantities within the computing system's registers and/or memories into other data similarly represented as physical quantities within the computing system's memories, registers or other such information storage, transmission or display devices.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:
1. A system comprising:
control circuitry configured to detect a current wherein the detected current is a battery discharge current or a battery charging current;
a first transistor, coupled to the control circuitry, configured to disconnect a load from at least one of a battery and a

DC/DC converter if the battery discharge current exceeds a maximum battery discharge current setting;

a second transistor, coupled to the control circuitry, configured to connect the battery to the DC/DC converter and adjust the battery charging current to maintain the battery charging current at or near a charge current setting; and a third transistor, coupled to the second transistor and the control circuitry, configured to maintain a connection between the battery and the DC/DC converter if the control circuitry is unable to function, wherein a drain of the third transistor is coupled to a gate of the second transistor so that a gate voltage of the second transistor is adjusted in response to a gate voltage of the third transistor.

2. The system of claim 1, wherein the first transistor is configured to disconnect the load or connect the load based at least in part on a first signal from the control circuitry, the first signal configured to turn the first transistor off or on.

3. The system of claim 1, wherein the gate voltage of the third transistor is adjusted in response to a second signal from the control circuitry, to adjust the gate voltage of the second transistor so that the second transistor operates in a linear operating region to maintain the battery charging current at or near the charge current setting.

4. The system of claim 1, further comprising a sense resistor, and wherein the detected current corresponds to a current flowing through the sense resistor.

5. The system of claim 1, further comprising a fourth transistor, coupled to the first transistor and the control circuitry, configured to maintain a connection between the load and at least one of the battery and the DC/DC converter if the control circuitry is unable to function, wherein a drain of the fourth transistor is coupled to a gate of the first transistor so that the first transistor is turned on or off in response to a state of the fourth transistor.

6. The system of claim 1, wherein the control circuitry comprises a battery charger controller circuitry configured to compare the charge current setting and the detected current and to provide a second signal to the third transistor based at least in part on the comparison.

7. The system of claim 1, wherein the control circuitry comprises a battery discharge protection circuitry configured to compare the maximum battery discharge current setting and the detected current and to provide a first signal to the first transistor based at least in part on the comparison.

8. The system of claim 1, wherein the first transistor is configured to maintain the load disconnected for a first time period and reconnect the load after the first time period.

9. The system of claim 8, wherein the first transistor is configured to maintain the load reconnected for a second time period and disconnect the load after the second time period if the battery discharge current exceeds the maximum battery discharge current setting.

10. A method comprising:
detecting a current using control circuitry, wherein the detected current is a battery discharge current or a battery charging current;
disconnecting a load from at least one of a battery and a DC/DC converter, using a first transistor, if the battery discharge current exceeds a maximum battery discharge current setting;
connecting the battery to the DC/DC converter using a second transistor;
adjusting the battery charging current using the second transistor to maintain the battery charging current at or near a charge current setting;
maintaining a connection between the battery and the DC/DC converter using a third transistor if the control circuitry is unable to function; and
adjusting a gate voltage of the second transistor in response to a gate voltage of the third transistor, wherein a drain of the third transistor is coupled to a gate of the second transistor.

11. The method of claim 10, wherein disconnecting the load is based at least in part on a first signal from the control circuitry, the first signal configured to turn the first transistor on or off.

12. The method of claim 10, wherein adjusting the gate voltage of the second transistor is based on adjusting the gate voltage of the third transistor in response to a second signal from the control circuitry, the second signal configured to adjust the gate voltage of the third transistor to cause the second transistor to operate in a linear operating region.

13. The method of claim 10, wherein detecting the current comprises detecting a voltage across a sense resistor, and the detected voltage corresponds to the current flowing through the sense resistor.

14. The method of claim 10, further comprising maintaining a connection between the load and at least one of the battery and the DC/DC converter if the control circuitry is unable to function using a fourth transistor, wherein a drain of the fourth transistor is coupled to a gate of the first transistor so that the first transistor is turned on or off in response to a state of the fourth transistor.

15. The method of claim 10, further comprising comparing the charge current setting and the detected current and providing a second signal to the third transistor based at least in part on the comparison, wherein adjusting the battery charging current is in response to the second signal.

16. The method of claim 10, further comprising comparing the maximum battery discharge current setting and the detected current and providing a first signal to the first transistor based at least in part on the comparison, wherein disconnecting the load is in response to the first signal.

17. The method of claim 10, further comprising maintaining the load disconnected for a first time period and reconnecting the load after the first time period.

18. The method of claim 17, further comprising maintaining the load reconnected for a second time period and disconnecting the load after the second time period if the battery discharge current exceeds the maximum battery discharge current setting.

19. The system of claim 1, further comprising a resistive element having a first terminal coupled to the gate of the second transistor and the drain of the third transistor, and having a second terminal coupled to an output terminal of the DC/DC converter.

20. The system of claim 10, wherein adjusting the gate voltage of the second transistor further comprises adjusting the gate voltage of the second transistor using a resistive element, wherein the resistive element has a first terminal coupled to the gate of the second transistor and the drain of the third transistor and has a second terminal coupled to an output terminal of the DC/DC converter.

* * * * *